Nov. 22, 1932.   J. B. GALBRAITH   1,888,381
CUTTING TOOL
Filed May 30, 1930
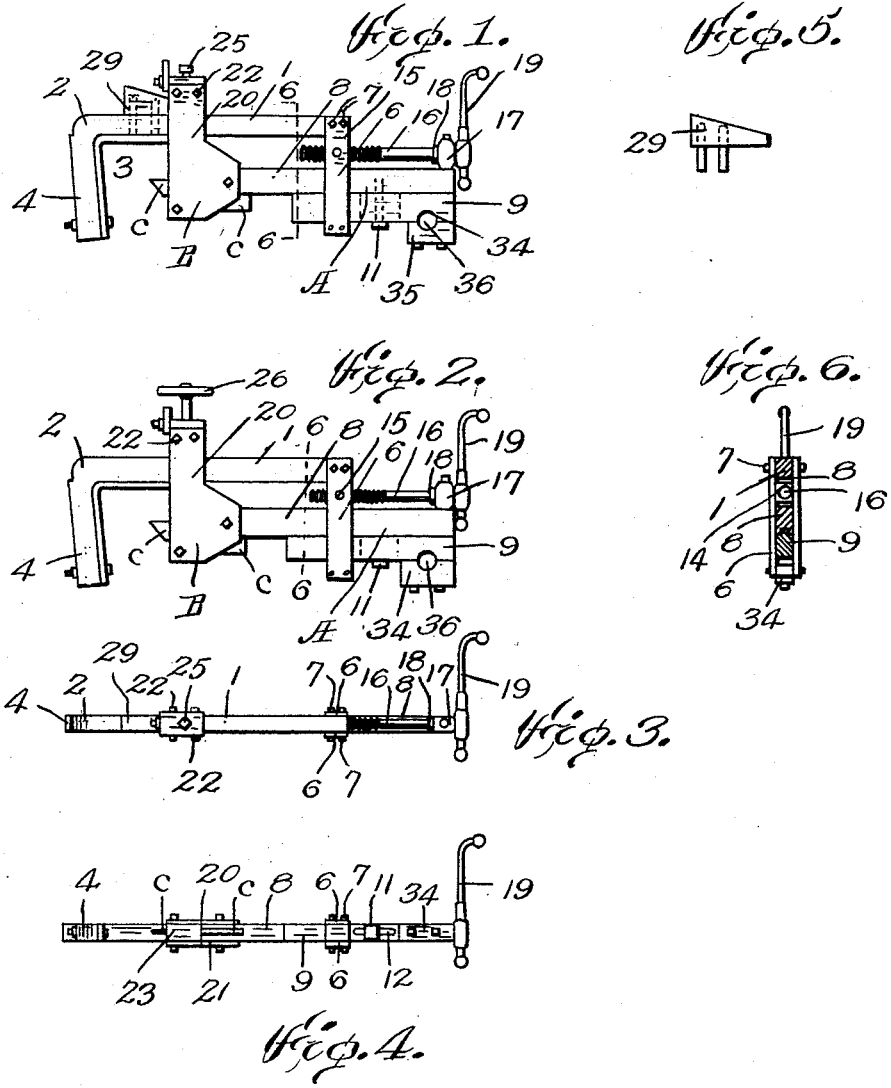
Inventor
Joseph B. Galbraith
By R. M. Thomas
Attorney Patented Nov. 22, 1932

1,888,381

UNITED STATES PATENT OFFICE

JOSEPH B. GALBRAITH, OF KAYSVILLE, UTAH

CUTTING TOOL

Application filed May 30, 1930. Serial No. 457,620.

My invention relates to cutting off tools and has for its object to provide a new and efficient cutting off tool for use in pipe cutting machines, on lathes or wherever it is necessary to cut off a piece of metal, which metal is rotating or can be made to rotate.

A further object is to provide a cutting off tool more primarily for use in pipe working machines and which tool may be adjusted to cut off large as well as small pipes with the machine automatically adjusting the cutting tool.

A still further object is to provide a cutting off tool which may be used on pipe or solid material and which machine is so made that by removing one portion of the tool the tool may be used on a lathe, cutting off solid material or by inserting the portion of the tool it may be used to cut off hollow articles such as pipes, tubing etc.

These objects I accomplish with the device illustrated in the accompanying drawing in which similar numerals and letters of reference indicate like parts throughout the several views and as described in the specification forming a part of this application and pointed out in the appended claims.

In the drawing in which I have shown the best and most preferred manner of building my invention Figure 1 is a side elevation of the tool as used to cut off pipe or hollow materials. Figure 2 is a side elevation of the tool as used in cutting off solid materials. Figure 3 is a plan view of Figure 1. Figure 4 is an inverted plan view of Figure 1. Figure 5 is a side elevation of the portion of the device used to raise the elevation of the cutting tool when used in cutting hollow tubing. Figure 6 is a section on line 6—6 of Figure 1.

In the drawing I have shown the tool as designed for use on pipe handling machines or on a lathe, but for hand cutting with the tool the handle A thereof may be lengthened to form a hand grip.

The tool consists of a back bar 1 having the end thereof bent downwardly at 2 and curved slightly back to form an acute angle 3 to the main bar 1 and with the leg 4 depending from the bend. A wearing plate of harder metal is then secured on the inner face of the leg, the bend and the end portion of the bar 1, to insure the tool wearing a long period of time. To the end of the back bar 1 I then secure a right angled brace 5 formed of two spaced apart bars 6 secured together at their lower ends by rivets and to the bar 1 by bolts 7. Slidably operable between the two bars 6 I then provide two sliding bars 8 and 9 which bars are held together by a dovetail joint 10 between the two bars so that the bar 8 may slide longitudinally along the top side of the bar 9. A tie bolt 11 is set into the bar 8 and a slot 12 is cut into the bar 9 to allow the bolt to slide longitudinally in said slot but limiting the longitudinal movement of the bar 8 to the length of the slot 12 in the bar 9. Between the two bars 6 above the bar 8 I provide a pivoted nut 14 which nut has pivot pins 15 extending from each side thereof into holes in the bars 6, and through the nut I screw an adjustment rod 16. On the end of the bar 8 I provide a boss 17 which boss is bored to receive the rod 16 and a shoulder 18 holds the rod 16 from longitudinal movement in the boss, but allows the rod to be rotated therein. A handle 19 is formed on the end of the rod 16 by which the adjustment of the rod may be made. The adjustment of the rod slides the bars 6 and the back bar 1 longitudinally along the bars 8 and 9.

On the end of the bar 8 I provide a framework $b$ which framework holds a cutting tool C and which frame is composed of two plates 20 and 21 secured together by suitable means and at the top end of the two plates above the bar 1, a block is secured by bolts 22, and a cutter blade holding block 23 is secured between the two lower ends of the plates in which the cutting blade or tool C is secured. An adjustment screw 25 is screwed down through the block 24 to rest on the top side of the back bar 1 adapted to vary the elevation of the cutting blade relative to the size of pipe being cut and to the angle of the bar 1. This screw may be provided with a handle 26 or may be made with a nut head 27 as shown in the different views of the drawing. In Figure 1 I have shown the type of cutter used for cutting hollow tubing such as pipe and this type of cutter is provided with a screw with a nut head 27 and a triangular shaped block 29 is carried on the top side of the back bar 1 by inserting pins 30 into holes 31 in the back bar. The bolts 32 and 33 through the plates 21 and 20 provide for adjustment of the cutting tool C, for by loosening the bolts the tool may be advanced or drawn back in the block 23.

In the drawing I have shown a groove 34 cut in the bottom side of the bar 9 and a grooved plate 35 secured thereunder forming a hole 36 therebetween in which a rod may be placed to rotate the device for cutting off a piece of material or the entire device may be mounted on a rod which is a part of the lathe or pipe cutting machine.

The operation of my tool is as follows:—

To cut off a piece of pipe the triangular shaped block 29 is fastened on the back bar 1. The device may then be adjusted to the outer perimeter of the pipe by placing the back bar 1 and the leg 4 around the pipe and then by rotating the rod 16 to place the cutting tool D against the work and as the rod is advanced the frame work B rides up the side of the block 29 automatically placing the cutting tool C at the correct position for the cut in any size of hollow tubing. The work to be cut is then rotated and the rod 16 rotated slowly at the same time thus cutting off the portion of the pipe not desired. It will be obvious that the entire tool might be rotated around the pipe and the pipe held stationary in a vise.

To cut off solid material the block 29 is removed and the two adjustment screws or rods are rotated to adjust the cutting tool C to the work to be cut off, with the back bar 1 and the leg 4 riding on and encompassing the work to be cut off. The work or the tool may then be rotated, with the other held stationary, thereby cutting off the material and as the cut advances the feed screw 16 must be slowly advanced to keep the cutting tool in the correct position at all times.

Having thus described my invention I desire to secure by Letters Patent and claim:—

1. In a cutting off tool the combination of a back bar having the end bent down to form a leg at an acute angle to the back bar; a blade carrying framework formed of two plates slidably carried on said back bar; a block spacing said plates apart and having an adjustment screw passed therethrough to raise said block from said back bar and said plates thereover; a triangular plate carried on the back of said bar to raise the framework as it is advanced to the work; a cutting blade set between said plates of the blade carrying framework at an angle thereto; a sliding bar secured to said framework and extending away from the cutting blade; spaced apart bars secured to the free end of said back bar between which bars said first mentioned bar is passed and carried; means to support said sliding bar on a suitable support; and an adjustment and feeding screw passed through a pivot block in said sliding bar and through a feed nut carried between said spaced apart bars said screw to feed said cutting blade to the work advancing and raising the blade to the work at the proper cutting angle at all times.

2. In a cutting off tool the combination of a back bar having one end bent down to form a leg at an acute angle to said bar; a blade carrying frame formed of spaced apart plates secured together by a spacer block; a blade carried in said plates at an angle thereto; a pair of spaced apart support bars secured at the free end of said back bar said bars carrying a threaded feed nut pivotally mounted therebetween; a set of sliding support bars carried through said support bars at right angles thereto; a feed screw secured on top of said sliding bars and passing into said feed nut; a triangular block carried on said back bar to raise the framework and cutting blades to the work as the cut advances by rotation of the feed screw; and an adjustment screw set through the spacer block of the blade carrying frame adapted to be rotated to adjust the cutting blade to the diameter of the work being cut.

In testimony whereof I have affixed my signature.

JOSEPH B. GALBRAITH.